Oct. 9, 1956
P. D. DI ADDEZIO
2,765,938
MOBILE SERVICE UNIT
Filed Jan. 30, 1953
2 Sheets-Sheet 1
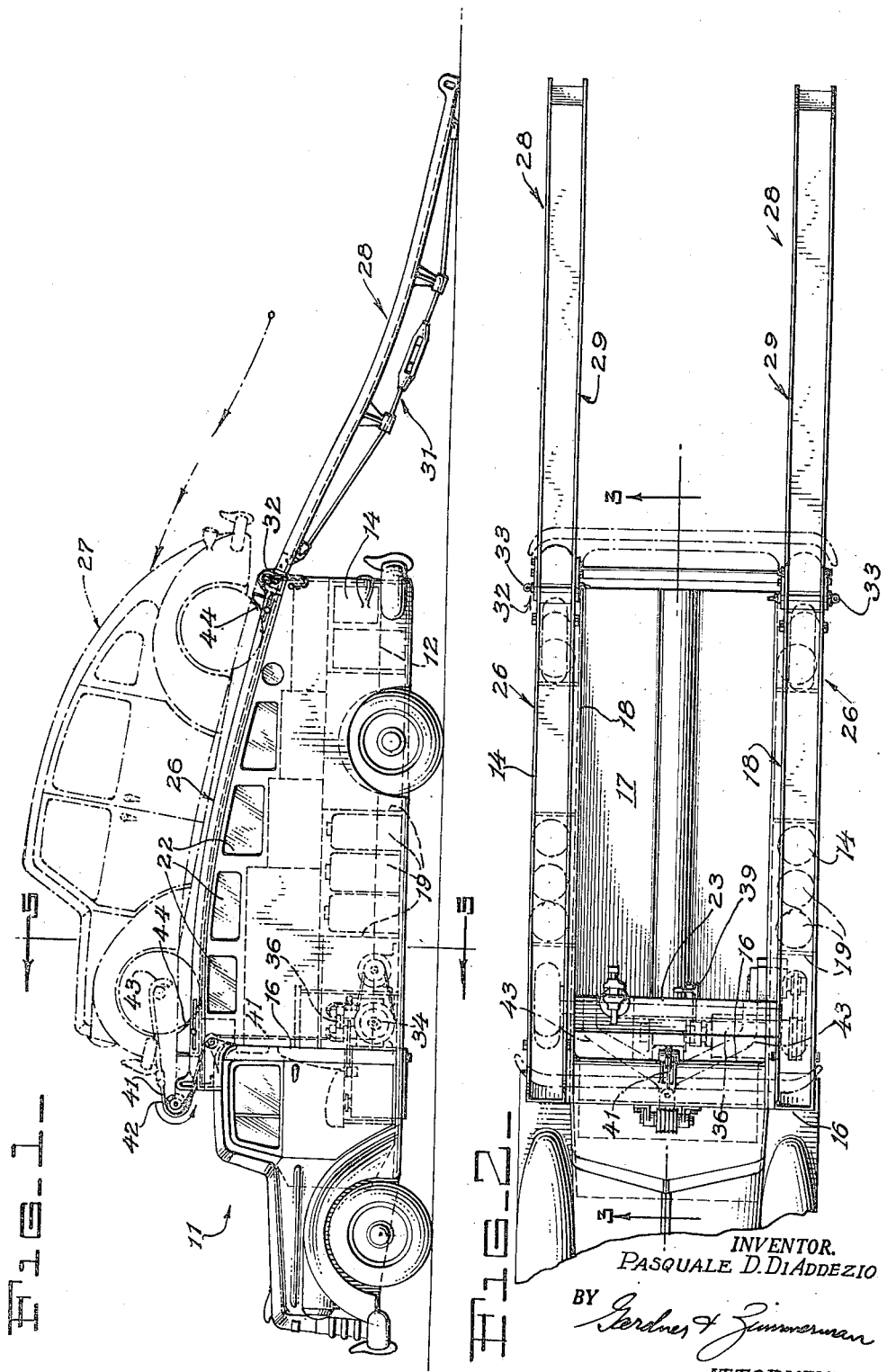
INVENTOR.
PASQUALE D. DiADDEZIO
BY
*Gerdnes & Zimmerman*
ATTORNEYS.

Oct. 9, 1956  P. D. DI ADDEZIO  2,765,938
MOBILE SERVICE UNIT
Filed Jan. 30, 1953  2 Sheets-Sheet 2
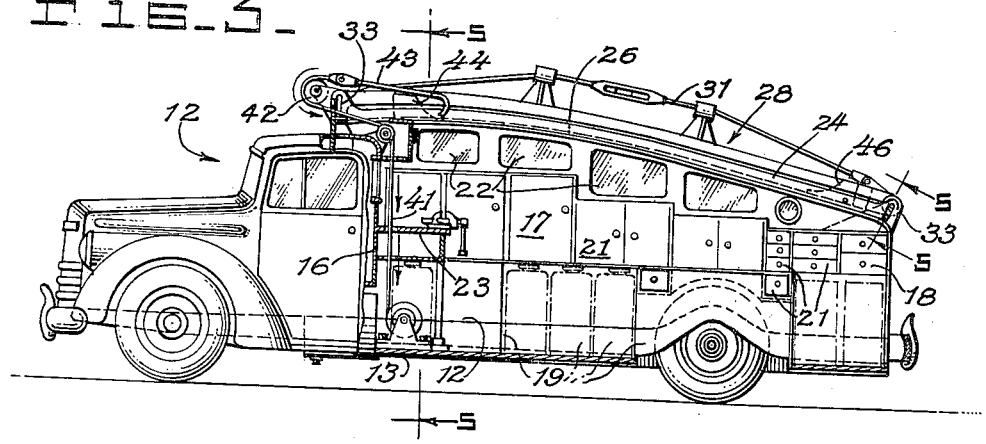
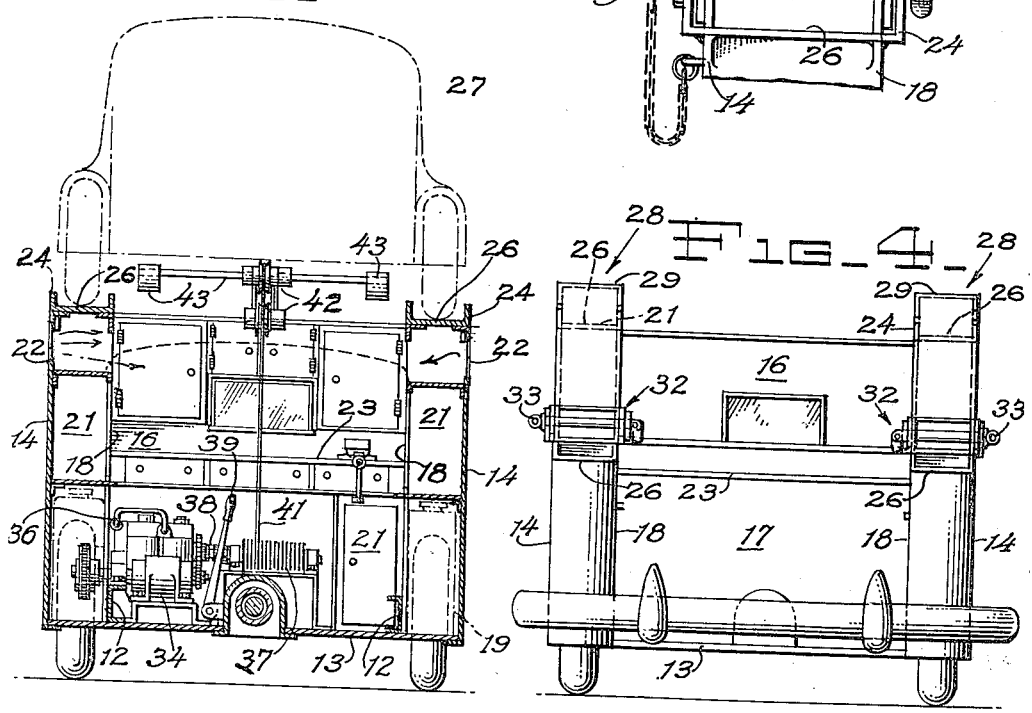
INVENTOR.
PASQUALE D. DiAddezio
BY
Gardner & Zimmerman
ATTORNEYS.

United States Patent Office 2,765,938
Patented Oct. 9, 1956

2,765,938

MOBILE SERVICE UNIT

Pasquale D. Di Addezio, Hayward, Calif.

Application January 30, 1953, Serial No. 334,237

6 Claims. (Cl. 214—85.1)

The present invention relates generally to a mobile service unit adapted to travel to and accommodate an automobile for servicing while including all of the equipment required for such servicing.

There are many instances where it is desirable or at least convenient to service or repair automobiles without moving them to a garage or service station. Ordinarily recourse must be had to stationary hoists or the like to raise an automobile sufficiently above the ground for changing the oil in the motor thereof, lubricating the grease fittings thereon, or repairing parts of the vehicle located underneath same. The present invention provides means for accomplishing any of the above at the site of the automobile by providing a mobile service unit adapted to travel to the automobile rather than the conventional converse procedure of requiring the car to go to the service facility. The mobile service unit of the present invention embodies all of the service facilities of a modern gasoline service station and at the same time is readily movable.

It is therefore an object of the present invention to provide an improved mobile service unit having automobile servicing facilities.

It is another object of the present invention to provide a mobile service unit including means for raising an automobile to a sufficient height for convenient servicing and repair thereof.

It is a further object of the present invention to provide a mobile service unit including a truck having vertical longitudinal walls on the back thereof defining a work space and means for raising an automobile onto said walls whereby same is serviceable from said work space.

The invention possesses other objects and features of advantage, some of which, with the forgoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

There is illustrated a preferred embodiment of the invention in the attached drawings wherein:

Figure 1 is an elevational view of the mobile service unit with the track in operated position and an automobile shown in phantom thereon.

Figure 2 is a plan view of the unit with the track in operated position.

Figure 3 is a sectional view taken at 3—3 of Figure 2 and showing the track in stored position.

Figure 4 is an end elevation of the unit.

Figure 5 is a sectional view taken at 5—5 of Figure 1 with an automobile shown in phantom atop the unit.

Figure 6 is a sectional view taken at 6—6 of Figure 3 and showing one means of track connection.

Considering now the structure of the illustrated embodiment of the invention and referring to the drawings thereof, there is provided a truck 11 having normal components such as a frame 12, four wheels, a cab, and a propulsion motor driving the truck wheels so that the truck 11 is readily movable in the manner of other automotive vehicles. Behind the truck cab is the truck bed 13 which extends rearward at least the length of an automobile and which is mounted below the frame 12 so as to be as low as possible, a central longitudinal portion of truck bed 13 being raised to accommodate the truck drive shaft if necessary. It will be noted that the above mentioned truck elements are in the main conventional so that a conventional truck chassis may be employed with a modified bed 13 being mounted thereon.

Upon truck bed 13 there are mounted a pair of longitudinal walls 14 which extend vertically upward from the longitudinal edges of bed 13 and which are coextensive therewith. Longitudinal walls 14 are quite rigid and are formed of structural material to support great weight, while they may be attached to truck frame 12 for added rigidity. Walls 14 have a maximum height at their forward end adjacent the truck cab and their height decreases toward the back end so that the top wall edge is gently curved, the average wall height above bed 13 being slightly greater than the height of an average man with the minimum wall height being substantially the height of an average man and the greatest wall height being no higher than an average man can conveniently reach to work. There may also be provided a rigid vertical wall 16 which extends transversely across truck bed 13 immediately behind the truck cab and which is attached at its ends to longitudinal walls 14 thereby increasing the rigidity and strength thereof.

There is defined by truck bed 13 and longitudinal and transverse walls 14 and 16 respectively a work room 17 which is open at the top and back, although the back may be closed by doors or the like if desired. Within work room 17 there are provided a second pair of longitudinally extending vertical walls 18 which are displaced inwardly from outer walls 14 and are disposed parallel therewith. Inner longitudinal walls 18 are attached to outer longitudinal walls at the ends thereof and each pair of adjacent walls define spaces which may either contain or comprise tanks 19. As illustrated, tanks 19 are separately formed and are disposed between adjacent walls 14 and 18 in removable relation thereto, however, tanks 19 may be formed directly by the adjacent vertical walls and suitable partitions therebetween which serve not only to partition tanks 19 but also to tie adjacent walls 14 and 18 together for added rigidity. Not all of the space between adjacent walls 14 and 18 need be occupied by tanks but rather it is advantageous to employ a portion of such space, particularly the upper and thus more accessible portions thereof as lockers 21 for storage of equipment or material, as shown. It will be appreciated that inasmuch as outer longitudinal walls 14 are disposed outside of the truck wheels and inner longitudinal walls 18 are disposed within the truck wheels a portion of the space between pairs of adjacent walls is devoted to wheel wells within which the truck wheels are disposed. Along the upper edge of longitudinal walls 14 and 18 there are provided a plurality of windows 22 which are preferably disposed in outer walls 14 and which communicate with work room 17 so that adequate light will enter same from the truck exterior. There may also be provided a work bench 23 within room 17 extending transversely thereof adjacent transverse wall 16 and a plurality of lockers may be disposed upon wall 16 above bench 23, with a window being provided in wall 16 aligned with the rear window of the truck cab to provide an unobstructed view to the rear of the truck through room 17 for the truck operator.

In addition to the above described structural members there are further provided atop vertical walls 14 and 18 a pair of channels 24. These channels have a U-shaped cross section and are each mounted upon an outer longitudinal wall and the adjacent inner longitudinal wall in rigid attachment to the upper edges thereof. Channels 24 together define a stationary track 26 upon which automobiles 27, such as that illustrated in Figures 1 and 5, are adapted to rest, and to this end the channel centers are separated substantially the transverse distance between the wheels of an average automobile while channels 24 are made sufficiently wide so that track 26 will accommodate substantially all cars whatever the transverse wheel separation. In addition to stationary track 26 there is further provided a movable track 28 which consists of a pair of rails 29 each having a U-shaped cross section and like transverse dimensions as channels 24. Rails 29 have a gentle concave curvature when disposed with the sides thereof upward in operated position and are adapted for movable connection at their ends to the rear ends of the individual channels 24 of stationary track 26. Rails 29 may each have stiffening means 31 attached to the backs thereof and such may include a pair of spaced lugs joined to the rail with guy wires extending therethrough from the rail ends and wire tightening means thereon, as shown in Figure 1 for example.

Movable track 28 is adapted to extend to ground level from the back end of stationary track 26 in operated position so that a complete track is provided from the ground up to the top of truck 11 above work room 17, however, movable track 28 is also adapted for storage out of contact with the ground in order not to impair the mobility of the unit. To this end there is provided a movable connection 32 at the intersection of each of the rails 29 of movable track 28 with its mating channel 24 of stationary track 26 and in the illustrated embodiment these connections are each formed with a toggle pin 33. Considering a single connection 32, as shown in Figure 6, an upwardly extending plate is attached to each side of channel 24 adjacent the end thereof and separated from the channel side. A like projection is provided on each side of mating rail 29 although attached directly to the rail sides so as to fit inside of the projections on channel 24 and the toggle pin 33 is disposed transversely of rail 29 and channel 24 through apertures in the projections thereon with the folding toggle pin end on one side of the channel and the toggle pin ring on the other. Toggle pin 33 may be chained to a lug upon channel 24 or wall 14 so as not to become misplaced when removed. The connection 32 above described will be seen to provide for rotation of rail 29 or disconnection thereof. Thus rails 29 may be stored upon hangers along longitudinal walls 14 much in the manner of ladders or the like when not in use and during movement of the truck and disposed in operated position by placing the rail ends in cooperation with the channel ends and inserting a toggle pin 33 in the connection. Alternatively, rails 29 may be stored atop channels 24 with toggle pins 33 in place and moved to operated position by rotating rails 29 about the toggle pins to swing the rails down from atop channels 24 into contact with the ground. The two latter described positions are shown in Figures 1 and 3, and there may be provided at the head of channels 24 and the ground or free ends of rails 29 apertured and mating projections which are adapted to be pinned or locked together when rails 29 are swung into stored position atop channels 24 so that by pinning same together they may be secured in stored position.

In addition to the truck and rail system there are further provided auxiliary means for moving an automobile into position for servicing and means for retaining same in this position. While an automobile may be driven from the ground upon movable track 28 in operated position and thence upon stationary track 26 into position above work room 17, it is advantageous to provide auxiliary motive means for moving the automobile into this position. There is thus provided within work room 17 and preferably disposed upon truck bed 13 under work bench 23 an engine 34 which may be either electrical or gasoline powered or may alternatively be driven through appropriate connections from the truck motor. A compressor 36 is driven from motor 34 to provide high pressure air for servicing automobiles and in addition a winch 37 is attached through a clutch 38 to engine 34. Suitable clutch control means such as a hand lever 39 is provided and a cable 41 is attached to and wound about winch 37, extending upward therefrom about pulleys 42 to vary the direction thereof and having attached to the free end thereof a drag hook 43. Cable 41 is adapted to be unwound to extend from pulley 42 at the front end of stationary track 26 to the ground end of movable track 28 where drag hook 43 may be attached to any convenient portion of an automobile 27 such as the bumper or front axle thereof and subsequent rewinding of cable 41 upon winch 37 thereby draws the automobile along the combined track system until it is disposed atop work room 17, as shown in Figure 1. Although the cable system may be employed to maintain the automobile 27 upon stationary track 26 it is preferable to provide additional and independent brake means which may include four blocks 44 adapted for disposition within the channel of stationary track 26. These blocks 44 are preferably formed with one end slanted curved on the radius of an automobile wheel and, with an automobile in position on stationary track 26, blocks 44 are disposed with one in back of each rear wheel and one in front of each front wheel, the curved block end being adjacent the wheel. Blocks 44 are locked in position to hold the automobile from moving and to this end longitudinal slots may be provided in the channel sides of stationary track 26 and tightening means such as bolts threaded into or through blocks 44 are disposed through these slots and tightened to secure blocks 44 in position. It will be appreciated that in the described embodiment of the locking or brake means the rear blocks must be removed in order to move the automobile onto or off of stationary track 26. However, if desired a rotatable plate or the like may be employed in place of rear blocks 44 so that only an adjustment thereof is needed to change from locked to unlocked position.

Operation of the above described mobile service unit is quite simple. With movable track 28 in stored position either atop stationary track 26 as illustrated or with the rails 29 thereof hung upon walls 14, the unit may be driven to whatever location is desired for servicing or repairing an automobile. The movable track 28 is then placed in operated position either by pinning the rails 29 thereof to the ends of channels 24 by pins 33 or by unlocking track 28 and rotating the rails thereof about connection 32 so that the ends of movable track 28 touches the ground. Cable 41 is then unreeled and drag hook 43 is attached to the automobile 27. With motor 34 energized control handle 39 is moved to engage clutch 38 so that winch 37 is driven by motor 34 thereby winding cable 41 onto the winch drum. As cable 41 is retracted automobile 27 is drawn upon movable track 28 and thence up onto stationary track 26. The front blocks 44 of the braking and locking means are preferably originally in place so that the automobile is drawn forward until it contacts these blocks. The winch 37 is then stopped and the rear blocks are positioned behind the automobile's rear wheels and locked in position so that the automobile is firmly held in place above work room 17. The operator may then easily accomplish from room 17 whatever servicing is required on the automobile, it being noted that the automobile is stationed in a position for maximum convenience for operations upon the underneath portions thereof, some six feet above the truck bed 13. Compressed air is available from compressor 36 for inflating tires, operating lubricating equipment, or driving air powered tools which may be conveniently stored in the ample storage space available. Lubricating oil and grease are conveniently stored in tanks 19 and gasoline may likewise be stored therein. Ample working and storage space is provided within room 17 with windows 22 providing lighting and work bench 23 providing a surface for repair work or temporary placement of tools or the like. The working facilities provided are in fact superior to conventional service stations with a maximum of convenience and availability being included. Lowering of the automobile is accomplished merely by reversing the steps of raising same and after restoring the rails of movable track 28 the mobile service unit is again ready for movement to another location.

I claim:

1. An improved mobile service unit comprising a truck having a low level elongated horizontally disposed bed, a first pair of vertical walls disposed longitudinally of said truck bed along the sides thereof and having a height of approximately five to six feet, a second pair of vertical walls disposed longitudinally of said truck bed spaced from said first pair of walls and each defining with the adjacent wall of said first pair of walls a storage compartment, a longitudinally extending stationary track having a pair of channels disposed one atop each of the walls of said first pair of vertical walls and adapted to support an automobile thereon, a movable track pivotally connected to the end of said stationary track at the rear of said truck and having a normal position atop said stationary track and an operated position extending from said stationary track to ground level at a small angle thereto, and means including a winch and cable for drawing a vehicle upon said stationary track over said movable track.

2. An improved mobile service unit comprising a truck having a flat bed thereon, a pair of spaced vertical walls disposed longitudinally of said truck bed along the side thereof, defining an uncovered work room upon said truck bed of a height sufficient to accommodate a man standing on said bed, a stationary track having a pair of channels disposed one along each of said walls and adapted to support the wheels of an automobile thereon, a movable track including a pair of U-shaped rails each pivotally mounted upon the rear end of one of the channels of said stationary track, said movable track being pivotable between a normal position with the rails thereof atop and along the channels of said stationary track and an operated position extending from the rear end of said movable track to ground level at a small angle thereto, motive means upon said truck bed for engaging an automobile and moving same along said movable track onto said stationary track, and brake means engaging said stationary track for maintaining an automobile thereon.

3. An improved mobile service unit as claimed in claim 2 further defined by the pivotal connection of said movable and stationary tracks comprising a pair of apertured projections upon the end of each of said stationary track channels and a pair of cooperating apertured projections upon the end of each of the rails of said movable track with a toggle pin extending through mating projections on each of said channel-rail connections whereby the rails of said movable track are pivotable and removable.

4. An improved mobile service unit as claimed in claim 2 further defined by said motive means comprising; an engine driven winch, a plurality of pulleys disposed between said winch and the front end of said stationary track, and a cable having a drag hook on one end thereof and attached at the other end thereof to said winch, said cable extending over said pulleys for engaging an automobile by the drag hook thereof and drawing same along said tracks upon winding about said drum.

5. An improved mobile service unit as claimed in claim 2 further defined by said brake means including a plurality of blocks having substantially the same width as the channel of said stationary track and adapted to fit therein, the channels of said stationary track having longitudinal slots in the upstanding sides thereof adjacent the channel ends, and a plurality of bolts adapted for extension through said slots into engagement with said blocks for securing same in adjustable position in said channels against the wheels of an automobile upon said stationary track to lock said automobile in position.

6. An improved mobile service unit comprising a truck having a balanced horizontally disposed flat bed thereon on which a man may stand, a pair of rigid structural walls disposed longitudinally of said truck bed along the edges thereof and extending vertically upward therefrom, said walls having substantially the length of an automobile wheelbase and a height of five to seven feet with the top edges thereof sloping downward toward the rear of the truck bed, a stationary track having a pair of U-shaped channels mounted one upon each of said vertical walls and extending the length thereof, the channels of said stationary track being separated by a distance substantially equal to the transverse wheel separation of an automobile whereby said stationary track is adapted to carry an automobile, a movable track including a pair of U-shaped rails having substantially the length of said stationary track, and connecting means including a pair of pins each removably engaging an end of one of said rails and the rear end of one of said channels whereby the rails of said movable track are attachable to the channels of said stationary track in pivotal relation thereto for movement between a first position atop and along the channels of said stationary track to a second position extending downward from the channel ends to ground level to provide an automobile passageway between ground and said stationary track.

References Cited in the file of this patent

UNITED STATES PATENTS

| | | |
|---|---|---|
| 1,280,141 | Bonner | Oct. 1, 1918 |
| 1,809,557 | Lishon | June 9, 1931 |
| 1,989,940 | McGaughan et al. | Feb. 5, 1935 |
| 2,135,857 | Stahl | Nov. 8, 1938 |
| 2,437,479 | Price | Mar. 9, 1948 |
| 2,492,829 | Baker | Dec. 27, 1949 |
| 2,598,113 | Dawson | May 27, 1952 |